US011689621B2

(12) United States Patent
Jung et al.

(10) Patent No.: US 11,689,621 B2
(45) Date of Patent: Jun. 27, 2023

(54) COMPUTING DEVICE AND STORAGE CARD

(71) Applicant: KOREA ADVANCED INSTITUTE OF SCIENCE AND TECHNOLOGY, Daejeon (KR)

(72) Inventors: Myoungsoo Jung, Daejeon (KR); Donghyun Gouk, Daejeon (KR); Miryeong Kwon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/561,777

(22) Filed: Dec. 24, 2021

(65) Prior Publication Data
US 2023/0007080 A1  Jan. 5, 2023

(30) Foreign Application Priority Data

Jul. 2, 2021 (KR) .......... 10-2021-0087313
Sep. 28, 2021 (KR) .......... 10-2021-0127935

(51) Int. Cl.
*H04L 67/1097* (2022.01)
*H04L 69/08* (2022.01)
*H04L 67/60* (2022.01)
*H04L 67/568* (2022.01)

(52) U.S. Cl.
CPC ........ *H04L 67/1097* (2013.01); *H04L 67/568* (2022.05); *H04L 67/60* (2022.05); *H04L 69/08* (2013.01)

(58) Field of Classification Search
CPC ... H04L 67/1097; H04L 67/60; H04L 67/568; H04L 69/08
See application file for complete search history.

(56) References Cited

U.S. PATENT DOCUMENTS

| | | | | |
|---|---|---|---|---|
| 10,075,524 | B1* | 9/2018 | Bshara | H04L 69/08 |
| 10,162,793 | B1* | 12/2018 | Bshara | H04L 69/16 |
| 11,137,924 | B2* | 10/2021 | Sterin | G06F 3/0604 |
| 2017/0177222 | A1* | 6/2017 | Singh | H04L 67/1097 |
| 2018/0095915 | A1* | 4/2018 | Prabhakar | H04L 49/9005 |
| 2018/0167352 | A1* | 6/2018 | Worley | H04L 69/22 |
| 2018/0189204 | A1* | 7/2018 | Sternberg | G06F 13/42 |
| 2018/0337991 | A1* | 11/2018 | Kumar | H04L 41/0897 |
| 2021/0089236 | A1* | 3/2021 | Yang | G06F 3/0659 |

(Continued)

OTHER PUBLICATIONS

Vikram Sharma Mailthody et al., "DeepStore: In-Storage Acceleration for Intelligent Queries," in The 52nd International Symposium on Microarchitecture (MICRO), MICRO-52, Oct. 12-16, 2019.

(Continued)

*Primary Examiner* — Jonathan A Bui
(74) *Attorney, Agent, or Firm* — Lex IP Meister, PLLC

(57) ABSTRACT

A first IP address is set to the host, and a second IP address is set to the storage card. A storage card includes a storage device and a processor for executing firmware. The host converts a first Ethernet packet including an ISP-related request and destined for the second IP address into an NVMe request according to an NVMe protocol, and transfers the NVMe request to the storage card. The firmware parses the NVMe request to perform the ISP-related request.

19 Claims, 14 Drawing Sheets

(56) References Cited

U.S. PATENT DOCUMENTS

2022/0206964 A1* 6/2022 Kim ................ G06F 13/107
2022/0377027 A1* 11/2022 Gai ................ H04L 45/74

OTHER PUBLICATIONS

Shengwen Liang et al., "Cognitive SSD: A Deep Learning Engine for In-Storage Data Retrieval," in The 2019 USENIX Annual Technical Conference (USENIX ATC), Jul. 10-12, 2019.

Sang-Woo Jun et al., "GraFBoost: Using accelerated flash storage for external graph analytics," in The 45th International Symposium on Computer Architecture (ISCA), 2018.

Yanqin Jin et al., "KAML: A Flexible, High-Performance Key-Value SSD," in The 23rd International Symposium on High Performance Computer Architecture (HPCA), Feb. 4-8, 2017.

Luis Cavazos Quero et al., "Self-Sorting SSD: Producing Sorted Data Inside Active SSDs," in The 31st International Conference on Mass Storage Systems and Technologies (MSST), 2015.

Zhenyuan Ruan et al., "Insider: Designing In-Storage Computing System for Emerging High-Performance Drive," in The 2019 USENIX Annual Technical Conference (USENIX ATC), Jul. 10-12, 2019.

Gunjae Koo et al., "Summarizer: Trading Communication with Computing Near Storage," in The 50th International Symposium on Microarchitecture (MICRO), Oct. 2017.

Boncheol Gu et al., "Biscuit: A Framework for Near-Data Processing of Big Data Workloads," in The 43rd International Symposium on Computer Architecture (ISCA), Jun. 2016.

Sudharsan Seshadri et al., "Willow: A User-Programmable SSD," in The 11st USENIX Symposium on Operating Systems Design and Implementation (OSDI), Oct. 6-8, 2014.

Anurag Acharya et al., "Active Disks: Programming Model, Algorithms and Evaluation," in The 8th International Conference on Architectural Support for Programming Languages and Operating Systems (ASPLOS), 1998.

* cited by examiner

COMPUTING DEVICE AND STORAGE CARD

CROSS-REFERENCE TO RELATED APPLICATION

This application claims priority to and the benefit of Korean Patent Application No. 10-2021-0087313 filed in the Korean Intellectual Property Office on Jul. 2, 2021, and Korean Patent Application No. 10-2021-0127935 filed in the Korean Intellectual Property Office on Sep. 28, 2021, the entire contents of which are incorporated herein by reference.

BACKGROUND

(a) Field

The described technology generally relates to a computing device and a storage card.

(b) Description of the Related Art

In-storage processing (ISP) is a well-known storage model to examine massive data sets, which can be applied in a broad range of big data analytics and emerging applications such as graph semantic analysis, bioinformatics, and machine learning. The ISP is expected to satisfy diverse data processing demands while removing overheads imposed by data movement between a host and a storage device. Since this nature can make ISP an energy-efficient and promising solution, there have been significant efforts in literature to integrate data processing into a non-volatile memory express (NVMe) solid-state drive (SSD) forming the ISP While industry has also paid great attention to realizing the storage intelligence by offering more powerful computing resources, it is non-trivial for an ISP-enabled SSD to satisfy all needs of various data processing applications. The most difficult part of incarnating a fully flexible ISP model is a practical design of runtime environment of the application and its application programming interface (API), not computing support in SSDs. Because of the protection demands for vendor-sensitive information and intellectual properties, it is almost infeasible to expose all the internal components and development environment of SSD firmware to ISP users. Thus, the SSD runtime environment and APIs to implement ISP tasks should be appropriately prepared and exposed by SSD vendors at a design time. However, building a storage system with such static runtimes and APIs is very challenging since application implementations to be used in the ISP and their requirement greatly change at every moment. Even if a set of well-designed APIs is properly given by the SSD vendors in advance, it enforces significant source-level modifications to ISP algorithms for offloading the existing applications to the ISP.

Most prior studies overlook the charge of servicing all input/output (I/O) requests as a block device while processing data within the storage device. Realizing this functionality of ISP requires a way different model implementation that most data processing accelerators employ such as graphics processing units (GPUs). Specifically, it can raise many storage-related vulnerability and resource protection problems in a real system, which make both ISP tasks and the host using the storage device unsafe to process data in the storage device. For example, since the SSDs have no knowledge on file management of the host, data in the storage device can be updated by the ISP task, and data being processed by the IPS task can be updated any host users, making the results undetermined.

SUMMARY

Some embodiments may provide a computing device and a storage card for implementing ISP technology to execute various applications within the storage card.

According to an embodiment, a computing device including a host to which a first internet protocol (IP) address is set and a storage card to which a second IP address is set may be provided. The storage card may include a computing complex configured to execute firmware and a storage device. The host may convert a first Ethernet packet including an ISP-related request and destined for the second IP address into a first NVMe request according to an NVMe protocol, and transfer the first NVMe request to the storage card. The firmware may parse the first NVMe request to perform the ISP-related request.

In some embodiments, the host may execute a network driver. The network driver may copy data of the first Ethernet packet to a kernel page, fill a physical region page (PRP) field of the first NVMe request with an address of the kernel page, set an operation code of the first NVMe request to a value indicating a transmit frame command, and transfer the first NVMe request to the storage card through an NVMe driver.

In some embodiments, the host may execute a network driver. In order to receive a second Ethernet packet destined for the first IP address from the storage card, the network driver may submit a second NVMe request to an NVMe queue, allocate a kernel page to allow the storage card to write data of the second Ethernet packet to the kernel page, set an operation code of the second NVMe request to a value indicating a receive frame command, and generate the second Ethernet packet by reading the data from the kernel page of the second NVMe request completed by the storage card.

In some embodiments, the ISP-related request may include an offloading request of a container image or a container execution request for executing a container.

In some embodiments, the firmware may include a mini-Docker layer configured to performs a docker function for container control and service for the ISP, and an operating system (OS) feature layer configured to perform an OS feature.

In some embodiments, the firmware may further include a host interface layer. The host interface layer may include a command parser configured to parse the first NVMe request and select a service path or a data path.

In some embodiments, the host interface layer may further include a network driver. The command parser may select the service path in response to an operation code of the first NVMe request having a predetermined value, and select the data path in response to the operation code of the first NVMe request not having the predetermined value. In response to selection of the service path, the network driver may copy the first Ethernet packet stored in a memory of the host indicated by a PRP of the first NVMe request to an internal memory of the computing complex, and notify a location of the internal memory to which the data is copied to the OS feature layer.

In some embodiments, the firmware may further include an internal cache layer and a flash translation layer. In response to selection of the data path, data of the first NVMe request may be stored in the storage device through the internal cache layer and the flash translation layer.

In some embodiments, the OS feature layer may include a network handler configured to perform a network function and an input/output (I/O) handler configured to perform an I/O function. The mini-Docker layer may include an API server, an image handler configured to manage a container image, and an execution handler configured to execute a container.

In some embodiments, in response to a port number of the first Ethernet packet having a value associated with a Docker command line interface, the network handler may forward the first Ethernet packet to the API server. The API server may transfer information obtained by parsing the first Ethernet packet to the image handler or the execution handler.

In some embodiments, in response to the port number of the first Ethernet packet does not have the value associated with the Docker command line interface, the network handler may forward the first Ethernet packet to the container.

In some embodiments, the container may generate an I/O request for the ISP or a network request to communicate with the host.

In some embodiments, the I/O handler may forward the I/O request to the data path.

In some embodiments, the network handler may forward the network request to the host through an asynchronous upcall via the network driver.

In some embodiments, the OS feature layer may further include a thread handler. The thread handler may separate a memory space of the storage device into a container pool accessible by the container and a firmware pool accessible by the firmware, and may provide a physical memory page from either the container pool or the firmware pool.

In some embodiments, the mini-Docker layer may further include a log handler. The log handler may manage container monitoring, and may transmit container monitoring information to the host through the network handler and the network module in response to receiving a logging command from the host.

According to another embodiment, a storage card connected to a host may be provided. The storage card may include a processor configured to execute firmware and a storage device. The firmware may include a host interface layer, a mini-Docker layer, and an operating system (OS) feature layer. The host interface layer may select a service path or a data path by parsing an NVMe request according to an NVMe protocol received from the host. The mini-Docker layer may include an image handler configured to perform container image management based on a network packet included in the NVMe request, and an execution handler configured to execute a container based on the network packet. The OS feature layer may include a network handler. In response to selection of the service path, the network handler may forward the network packet to the mini-Docker layer or the container, and may forward a network request, generated in the container, for communicating with the host to the host interface layer.

In some embodiments, the mini-Docker layer may further include an API server. The network handler may forward the network packet to the API server in response to a port number of the network packet having a predetermined value, and forward the network packet to the container in response to the port number of the network packet not having the predetermined value have. The API server may transfer information of the network packet to the image handler or the execution handler.

In some embodiments, the firmware may further include an internal cache layer and a flash translation layer, and the OS feature layer may further include an I/O handler. The I/O handler may forward the network packet to the internal cache layer in response to selection of the data path.

In some embodiments, the I/O handler may forward an I/O request for an ISP generated in the container to the data path.

In yet another embodiment, a computer program stored in a non-transitory recording medium and configured to be executed by a computing device including a host and a storage card may be provided. The computer program may cause the computing device to execute setting a first internet protocol (IP) address and a second IP address to the host and the storage card, respectively, converting a first Ethernet packet, which includes an in-storage processing (ISP)-related request and is destined for the second IP address, into a first non-volatile memory express (NVMe) request according to an NVMe protocol, and forwarding the first NVMe request to an NVMe drive to transfer the first NVMe request to the storage card.

In some embodiments, converting the first Ethernet packet into the first NVMe request may include copying data of the first Ethernet packet to a kernel page, filling a physical region page (PRP) field of the first NVMe request with an address of the kernel page, and setting an operation code of the first NVMe request to a value indicating a transmit frame command.

In some embodiments, the computer program may cause the computing device to further execute, in order to receive a second Ethernet packet destined for the first IP address from the storage card, submitting a second NVMe request to an NVMe queue, allocating a kernel page to allow the storage card to write data of the second Ethernet packet to the kernel page, setting an operation code of the second NVMe request to a value indicating a receive frame command, and generating the second Ethernet packet by reading the data from the kernel page of the second NVMe request completed by the storage card.

DETAILED DESCRIPTION OF THE EMBODIMENTS

Figure 1:
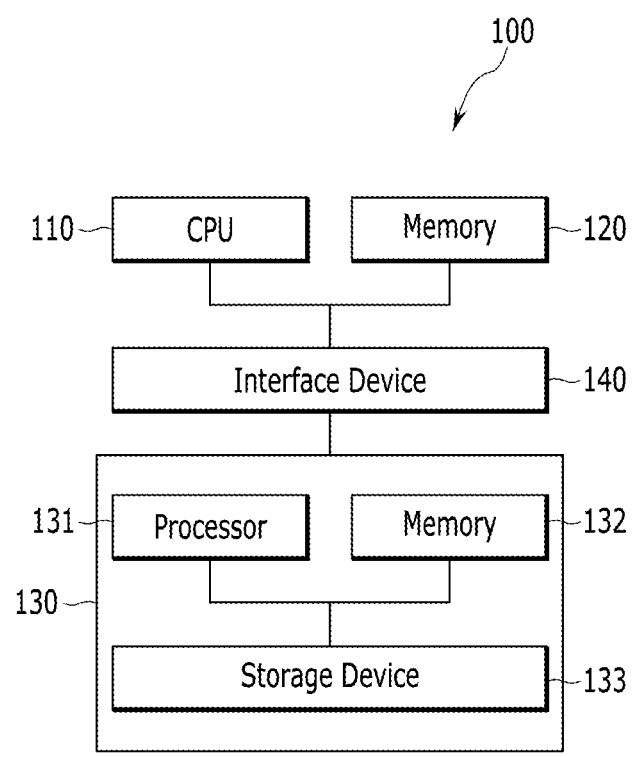
FIG. 1 is an example block diagram of a computing device according to an embodiment.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

As used herein, the singular forms "a", "an" and "the" are intended to include the plural forms as well, unless the context clearly indicates otherwise.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

FIG. 1 is an example block diagram of a computing device according to an embodiment.

Referring to FIG. 1, a computing device 100 includes a processor 110, a memory 120, and a storage card 130. FIG. 1 shows an example of the computing device, and the computing device may be implemented by various structures.

In some embodiments, the computing device may be any of various types of computing devices. The various types of computing devices may include a mobile phone such as a smartphone, a tablet computer, a laptop computer, a desktop computer, a multimedia player, a game console, a television, and various types of Internet of Things (IoT) devices.

The processor 110 performs various operations (e.g., operations such as arithmetic, logic, controlling, and input/output (I/O) operations) by executing instructions. The processor may be, for example, a central processing unit (CPU), a graphics processing unit (GPU), a microprocessor, or an application processor (AP), but is not limited thereto. Hereinafter, the processor 110 is described as a CPU 110.

The memory 120 is a system memory that is accessed and used by the CPU 110, and may be, for example, a dynamic random-access memory (DRAM). In some embodiments, the CPU 110 and the memory 120 may be connected via a system bus. A system including the CPU 110 and the memory 120 may be referred to as a host. The memory 120 may be referred to as a host memory.

The storage card 130 includes a computing complex and a storage device 133. The computing complex may correspond to a frontend of the storage card 130, and the storage device 133 may correspond to a backend of the storage card 130.

The computing complex connects the host including the CPU 110 and the memory 120 to the storage device 133. In some embodiments, the computing complex may include a processor 131 and an internal memory 132. In some embodiments, the processor 131 may be a multi-core processor. The internal memory 132 may include, for example, DRAM. In some embodiments, the computing complex may use a non-volatile memory express (NVMe) protocol as a protocol for accessing the storage device 133. Hereinafter, the protocol is described as the NVMe protocol, but embodiments are not limited thereto and other protocols may be used.

The storage device 133 may include a non-volatile memory-based memory module. In some embodiments, the storage device 133 may include a flash memory-based memory module. The flash memory-based memory module 133 may be, for example, a solid state drive (SSD), a secure digital (SD) card, a universal serial bus (USB) flash drive, or the like. In some embodiments, the storage card 130 may be connected to the host through a host interface. In some embodiments, the host interface may include a peripheral component interconnect express (PCIe) interface. Hereinafter, the host interface is described as a PCIe interface, but embodiments are not limited thereto and other host interfaces may be used.

In some embodiments, the computing device 100 may further include an interface device 140 for connecting the storage card 130 to the host including the CPU 110 and the memory 120. In some embodiments, the interface device 140 may include a root complex 140 that connects the host and the storage card 130 in a PCIe system. In some embodiments, the storage card 130 may further include an endpoint (not shown), for example a PCIe endpoint, for connection with the interface device 140.

First, a typical storage card is described with reference to FIG. 2 and FIG. 3.

Figure 2:
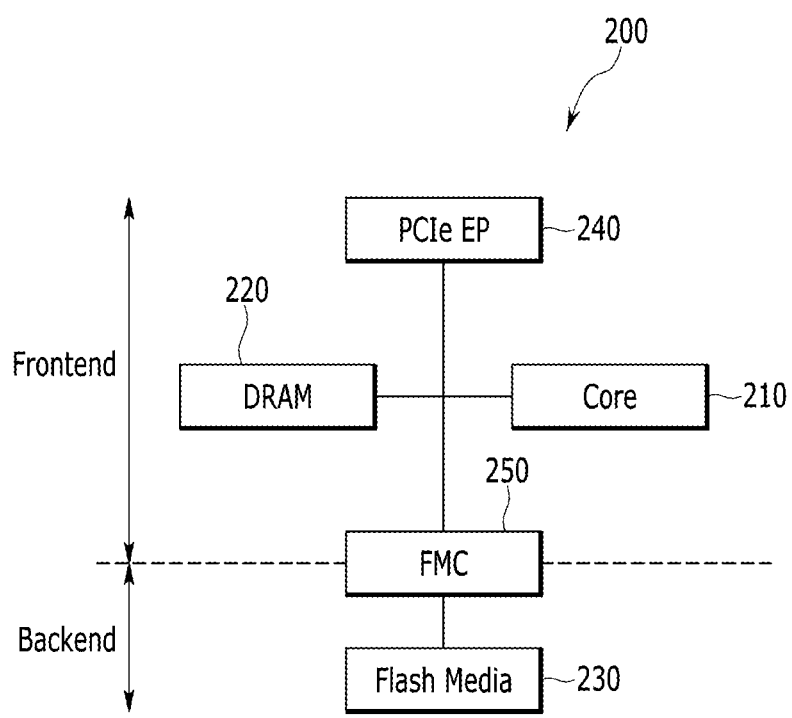
FIG. 2 is an example block diagram of a storage card.
Figure 3:
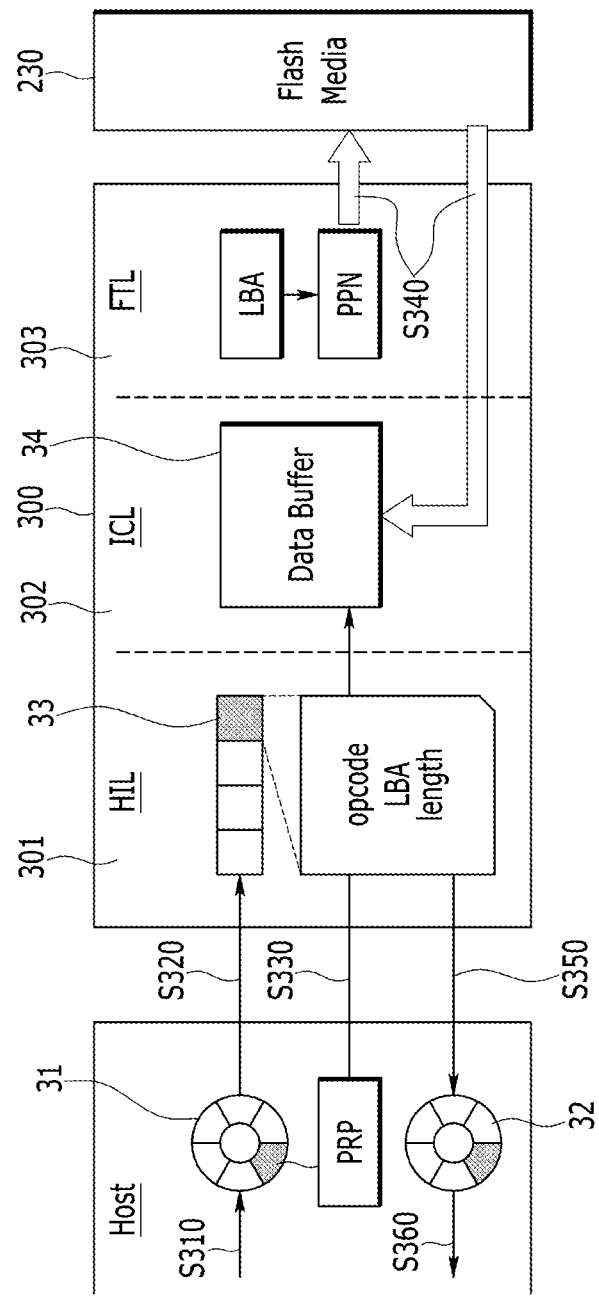
FIG. 3 is an example diagram showing a firmware stack of a storage card.

FIG. 2 is an example block diagram of a storage card, and FIG. 3 is an example diagram showing a firmware stack of a storage card. FIG. 2 and FIG. 3 exemplify a PCIe storage card implementing an SSD using a NAND flash memory for convenience of description.

Referring to FIG. 2, a storage card 200 includes a processor 210, an internal memory 220, and flash media 230. The processor 210 and the internal memory 220, for example, a DRAM 220, correspond to a computing complex that is a frontend of the storage card 200, and the flash media (NAND flash) 230 corresponds to a backend of the storage card 200. The processor 210 may include a plurality of cores.

The storage card 200 is connected to a host through a PCIe endpoint (EP) 240. The backend includes a plurality of I/O buses called channels, each connecting the flash media 230 through a flash memory controller (FMC) 250.

The storage card 200 may include the plurality of flash media 230 over multiple channels to improve parallelism and increase backend storage density. The DRAM 220 is used for buffering data between the host and flash media 230. The DRAM 220 may also be used to maintain metadata of firmware running on the processor 210.

The storage card 200 obeys NVMe that defines multiple queues, I/O commands, and data transfer methods over PCIe. Referring to FIG. 3, each queue is logically paired by a submission queue (SQ) 31 and a completion queue (CQ) 32. The SQ 31 and the CQ 32 may be formed in a host memory (e.g., 120 in FIG. 1). When a user issues an I/O request to the storage card 200, a host NVMe driver submits the request (NVMe command) to the SQ 31 and informs the submission to the storage card 200 by writing a doorbell register (S310). An NVMe controller of the storage card 200 fetches a new NVMe command from the SQ 31 (S320). The NVMe command may be stored in a command queue 33 of the storage card 200. The NVMe controller parses the NVMe command. The NVMe command includes memory addresses called a physical region page (PRP). The PRP indicates where the data to be accessed is located in the host's kernel memory space. Using the PRP, the NVMe controller may directly transfer the data through direct media access (DMA) (S330). Once an I/O service finishes, the NVMe controller records request completion in the CQ (S350) and then notifies the host that the request processing is complete through a message signaled interrupt (MSI) (S360).

The frontend of the storage card 200 includes firmware 300 that includes a host interface layer (HIL) 301, an internal cache layer (ICL) 302 and a flash translation layer (FTL) 303. The firmware 300 may be executed by the processor 210 of the storage card 200. The firmware 300 handles the NVMe protocol and the backend I/O. The HIL 301 implements the NVMe controller and manages the queues and data transfer. Further, the HIL 301 parses the NVMe command and extracts I/O information, such as an operation code (opcode) indicating read or write, a logical address (e.g., a logical block address (LBA)), and a block length from the NVMe command. The ICL 302 copies data from a host memory to the internal DRAM 220 using the internal DRAM as a data buffer 34 (S330). The HIL 301 hides a complexity of firmware via a block interface, and the ICL 302 reduces backend access latency. The FTL 303 translates the LBA into a physical flash address (e.g., a physical page number (PPN)) of the flash media 230, and transfers the data buffered in the DRAM 220 to the flash media 230 (S340). The FTL 303 manages a reliability of the flash media 230 by performing garbage collection and wear-leveling.

Figure 4:
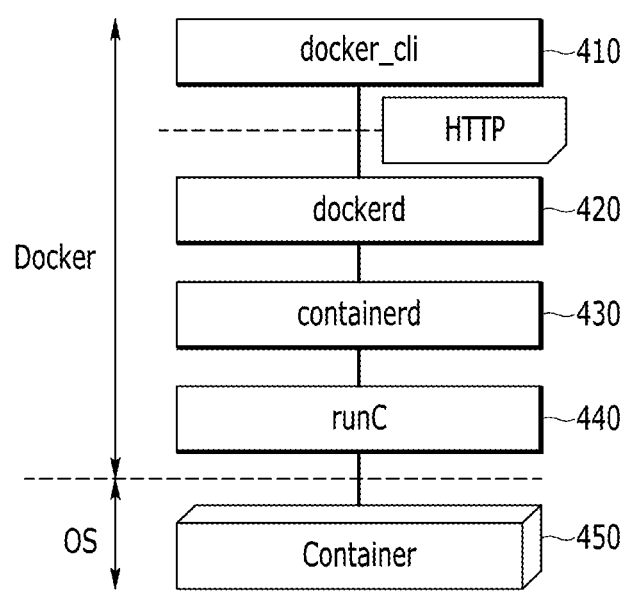
FIG. 4 is an example diagram showing a Docker stack in OS-level virtualization.
Figure 5:
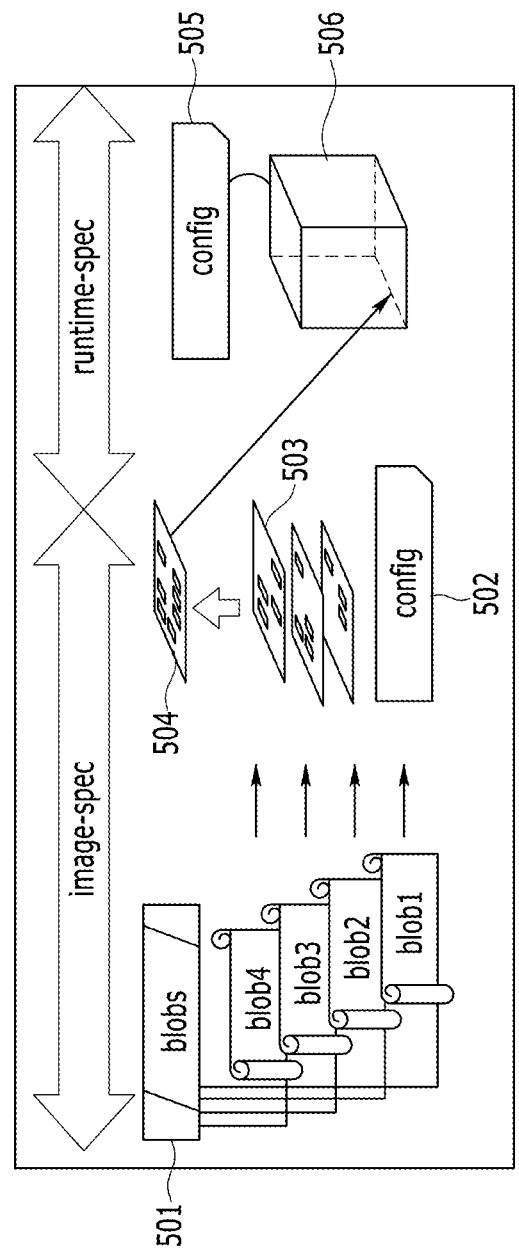
FIG. 5 is an example diagram showing container creation in OS-level virtualization.

FIG. 4 is an example diagram showing a Docker stack in operating system (OS)-level virtualization, and FIG. 5 is an example diagram showing container creation in OS-level virtualization.

Referring to FIG. 4, a container 450 utilize control groups (cgroups) and namespaces of an OS (e.g., Linux) kernel to allow a creation of multiple isolated virtual environments on a single host and running of workloads. Each virtual environment becomes a lightweight virtual machine that excludes virtual machine emulation managers but includes all necessary applications and runtime environments in a format of files. The open container initiative (OCI) offers runtime specification (runtime-spec) and image specification (image-spec), which are standards for storing and running the container 450. Each standard defines how to load a container image and to run a manifest file that maintains metadata to lunch an application. Docker extends the container to offer portable container deployment, versioning, and component reusability via binary large objects (blobs). The blob serializes each user's applications and runtime environments, which can be quickly installed to any other Docker-enabled systems.

As shown in FIG. 4, a user (e.g., a user's application) may simply ask for a service to a Docker server, called Docker daemon (dockerd) 420, through a Docker command-line interface (docker-cli) 410. The dockerd 420 may enable Docker-only features such as volume management and repository push/pull, and may exchange commands with the user through HTTP REST API. The dockerd 420 may also configure a virtual bridge network, which allows the user and each container 450 to communicate as an individual host. Underneath the dockerd 420, a container daemon (containerd) 430 manages an image and the container 450. A container runtime (runc) 440 configures namespace and cgroups, and actually runs the container 450.

Referring to FIG. 4 and FIG. 5, to convert a stored container image to a container, the Docker stack downloads blobs 501 from a predefined location. Then, the containerd 420 unpacks each blob 501 based on the image-spec, which turns it into a configuration file 502 and file image layers 503. Based on the configuration file 502, the containerd 420 merges the layers 503 and generates a root filesystem (rootfs) 504 of a container. Based on the runtime-spec, the runc 440 creates a runtime configuration 505 such as environment variables and a target entry point for application execution, and mounts the rootfs 504 to the container 506 and launches the application.

The cgroups and namespaces are OS kernel features, not container's functionalities. Although the container uses two kernel features, the execution environment of the container follows the runtime-spec and image-spec of the OCI. The cgroups and namespaces in the OS-level virtualization are only used for multi-tenant support by isolating the host computer's resources and throttling performance. Instead, the Docker stack is responsible for creating and executing containers, and each container is just a process on a host.

Next, technical challenges and overheads of the ISP are described with reference to FIG. 6.

Figure 6:
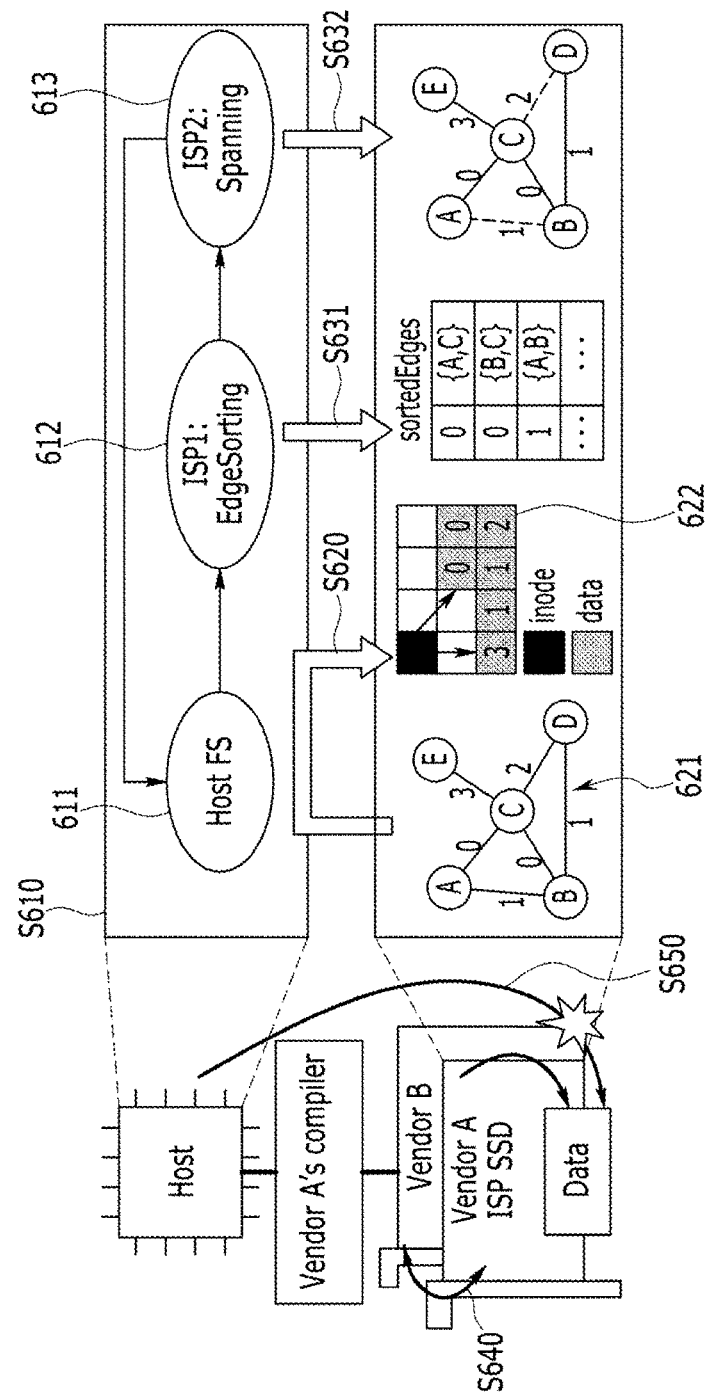
FIG. 6 is an example diagram for explaining limitations of the conventional ISP.

FIG. 6 is an example diagram for explaining limitations of the conventional ISP. FIG. 6 exemplifies a case in which a minimum spanning tree (MST) algorithm of a graph analysis application is executed in an SSD.

ISP has a deep-rooted history from the early 1980s. The ISP has begun to be applied to low complex applications, such as data scan and filter, and has been extended for general purpose applications in the late 1990s. However, the ISP has experienced many pitfalls and has not been fully successful because of low disk performance and low bandwidth communication. Recently, SSDs have significant technology shifts and become dominant storage in many computing domains since their performance and interface bandwidth almost pull up those capacities of main memory and system buses.

Thus, ISP researches in SSD-resident processing are recently experiencing a resurgence. While there are diverse studies for ISP models, the studies may be classified into two categories: i) domain-specific acceleration (DSA) and ii) function as a service (FaaS) like acceleration. The two categories are similar to domain-specific acceleration (DSA) and function as a service (FaaS). The DSA mainly focuses on creating the ISP optimized for a specific application which can take advantage of data movement reduction. For example, filtering data within an SSD and offloading a key-value stack to storage are implemented. These DSA proposals show the potential benefits of ISP, but they are limited to accelerate the specific application. In addition, they are performed with an assumption that a large amount of or whole of the specific application can be offloaded to the SSD.

In contrast, FaaS-like ISP models design a set of APIs that makes different types of function, which can be integrated into the SSD firmware. They use remote procedure call (RPC) or vendor-customized PCIe packet communications to realize a generic task offloading. Although the FaaS-like studies move towards more general-purpose ISP computation, they are yet way different from a fully flexible ISP. In particular, the FaaS-like ISP models increases data transfers whose latency accounts for 86% of the actual execution time in the SSD. This contradicts the long-standing concept of ISP.

For widespread adoption of ISP, the ideal ISP model should be easy-to-use and not enforce the current computing environment a change, including existing hardware and application. It requires being as much general as the host processor can process data and minimizing the data transfer overhead, such that the host can be assigned to operate other operations in parallel with ISP tasks. However, the existing DSA and FaaS-like ISP models raise five challenges: i) hand-on application partitioning, ii) ignorance of file layouts, iii) ISP task switching overhead, iv) device dependency, and v) data vulnerability. These challenges are described with reference to FIG. 6.

First, the hand-on application partitioning is described. Based on APIs given by vendors, a user decides which part of an application to offload. During this process, the user should be aware of whether a specific part of the application is executed in the host or in the SSD, and modify a code in a way that can be offloaded accordingly. For example, as shown in FIG. 6, the user needs to inform a graph file location to the SSD by collaborating with the host filesystem 611 (S610). The user also needs to decompose a minimum spanning tree (MST) algorithm into two specific ISP tasks including an ISP task (ISP1) for sorting edges of the graph and an ISP task (ISP2) for spanning the tree from the minimum edge weight, which owes to a lack of runtime support at the SSD. On the other hand, it is non-trivial and impractical for the user to manually analyze the application and rewrite source codes, and there is a problem that the ISP performance is determined according to the user's programming experience.

Second, the ignorance of file layouts is described. Most applications access the SSD over the file system, but the SSD firmware lacks information about the layout of how the file system stores files. Thus, the user should retrieve a location of the data to be processed in the form of a set of LBAs and inform the ISP tasks about the LBA set. For example, as in S620 of FIG. 6, since the graph file is spread on the SSD, the user needs to traverse LBAs of data through the index node (Mode) of the file (621), creates the LBA set (622), and transfer the LBA set to the SSD via RPCs (remote procedure calls). Once the SSD receives the corresponding LBA set, it can know which flash the actual data is stored in through FTL. The extra communication overhead to synchronize the data location between the host and the SSD not only introduces many context switches on the host, but also makes the computing resources idle because the ISP tasks cannot perform operations without knowing where the data is located.

Third, the ignorance of file layouts is described. Due to the above problem, the current ISP models cannot offload everything of the target application to the SSD, and require switching the ISP tasks. This task switching overhead introduces a new type of data transfers for processing data through the ISP, and reduces the degree of execution parallelism between the host and SSD. After ISP1 sorts all edges (S631), ISP2 can be activated (i.e., a tree may be spanned based on the minimum edge weight) (S632). ISP1 can be executed after the LBA set of the file to be read is successfully offloaded from the host (S631). As the host- or storage-side tasks require waiting for other tasks, the utilization rate of each computational resource can be lowered. Furthermore, this execution chain of ISP tasks may be repeated multiple times when the application requires processing multiple graph files.

Fourth, the device dependency is described. The user needs to recompile the partitioned application. Since the ISP tasks should be executed as a part of the SSD firmware, it also requires for the ISP tasks to perform a cross-compile with a toolchain guided by vendors (S640). Due to the cross-compilation, even if the programmers may perform well on the partitioning, it introduces the device dependency that may lead to poor portability and compatibility across different firmware versions and storage configurations.

Fifth, the data vulnerabilities are described. Even if all challenges described above are addressed, the existing ISP models overlook vulnerabilities raised by parallel execution between the host and the SSD (S650). The SSD is a block device, which is shared by all the host uses, and there is no data protection mechanism inside the SSD because the file system manages permissions. Thus, the partitioned application and offloaded ISP tasks can simultaneously access the same data. Unfortunately, this can introduce nondeterministic situations and raise serious vulnerability issues. For example, the flash that stores data that is currently being processed by the ISP task may be overwritten by the other ISP task or host application that does not own the data. Further, because the data for the ISP tack is accessed by the other applications and then is changed, the ISP task may be in an unpredictable situation.

Although the processor of the storage card shows the performance of a middle-end CPU, the execution performance shown by the ISP cannot be equal to or better than that of processing the data at a host-level. Further, the existing IPS models exhibit worse performance than the host because of the aforementioned ISP communication overhead. In some embodiments, the ISP model may be modified to run independently from the host. Accordingly, the corresponding communication overhead can be removed, which in turn can make the ISP more comparable or even better compared with the host-side data processing.

Next, a storage card according to various embodiments is described with reference to FIG. 7 to FIG. 14.

Figure 7:
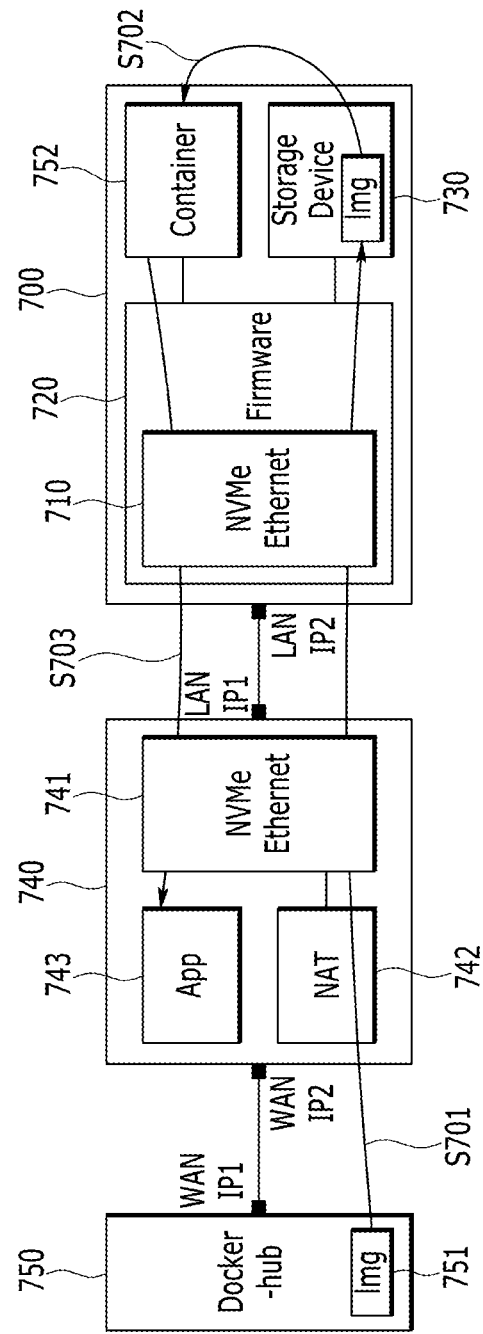
FIG. 7 is an example diagram for explaining a storage card according to an embodiment.
Figure 8:
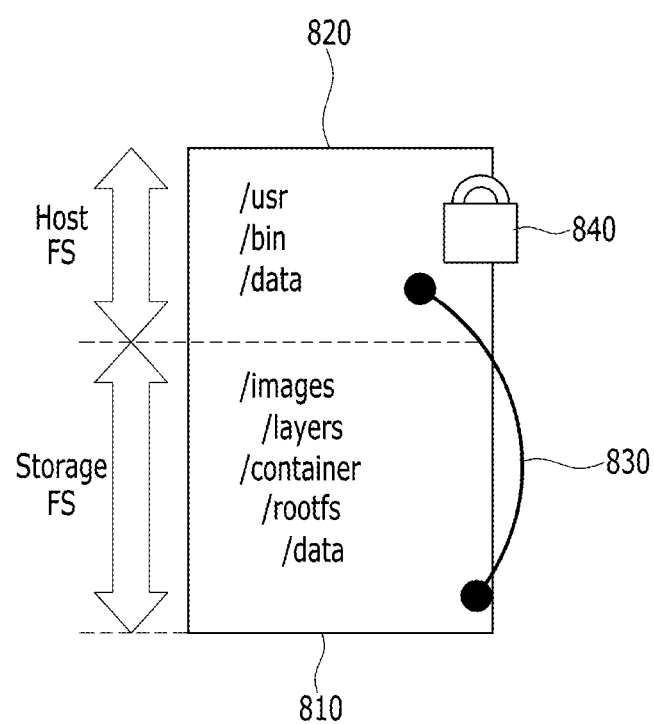
FIG. 8 is an example diagram for explaining an example of a filesystem of a computing device according to an embodiment.

FIG. 7 is an example diagram for explaining a storage card according to an embodiment, and FIG. 8 is an example diagram for explaining an example of a filesystem of a computing device according to an embodiment.

In some embodiments, a storage card may free a host from ISP management and execute an entire application, not a function or a task, without changing existing data processing applications and hardware environment. To this end, the storage card may virtualize ISP execution and allow the host to use a containerized application (i.e., container) for ISP. The storage card may pull (download) any application and execute it in a form of the container. During the container execution, the host may not be involved in ISP control. The storage card may provide ISP services while serving block I/O requests from the host. Through such ISP virtualization, the five challenges described above can be addressed.

Referring to FIG. 7, a storage card 700 includes a network driver 710, firmware 720, and a storage device 730. The firmware 720 may be Docker stack enabled firmware. The network driver 710 and the firmware 720 may be executed by a processor (e.g., 131 in FIG. 1) of the storage card 700.

The network driver 710 enables Ethernet-based local network (e.g., point-to-point (P2P) network) together with a network driver 741 of a host 740. The network drivers 710 and 741 enable Ethernet communication over PCIe via a NVMe protocol. Hereinafter, the local network is referred to as an "NVMe Ethernet" (or "Ethernet over NVMe" or "Ether-oN"), and the network driver is referred to as an "NVMe Ethernet driver". The host 740 (e.g., the NVMe Ethernet driver 741) and the storage card 700 (e.g., the NVMe Ethernet driver 710) each have its own Internet protocol (IP) address. By setting an environment variable of the host 740 (e.g., DOCKER_HOST) with the IP address of the storage card 700, a user (e.g., the application 743 of the user) may issue an IPS-related request to the firmware 720 of the storage card 700 through the NVMe Ethernet drivers 741 and 710. In some embodiments, NVMe Ethernet drivers 741 and 710 may set the IP addresses for host 740 and storage card 700, respectively. In some embodiments, the host 740 may send the ISP-related request to the firmware 720 using docker-cli. In some embodiments, the ISP-related request may include an offloading request of a container image or a container execution request to run the container.

The firmware 720 may support downloading image 751 (blob/layers) (S701), creating a container 752 from the image 751 and executing the container 752 (S702), or container communication and monitoring (S703). Since the firmware 720 manages all ISP offloading and execution, the user (e.g., the application 743 of the user) may deal with an ISP model of the storage card like conventional Docker framework. Accordingly, the host 740 may transmit a user's command (request) to the firmware 720 via the NVMe Ethernet driver 741. The NVMe Ethernet driver 741 may set the IP address of the storage card 700 in the NVMe Ethernet as a destination address of the command, and may transmit it to the storage card 700. The storage card 700 may transmit the user's command to the firmware 720 via the NVMe Ethernet driver 710. For example, to offload the container, the user may ask a blob download (e.g., docker image load) to the firmware 720 via the NVMe Ethernet drivers 741 and 710.

The host 740 may configure a network address translation (NAT) 742 so that the storage card 700 can be directly connected to the Internet. That is, the host 740 may configure the NAT to route network requests from/to the IP address of the storage card 700. For example, the host 740 may translate an address (i.e., an address of the host 740) WAN_IP2 of a request received from a Docker-hub 750 to an IP address LAN_IP2 of the storage card 700 in the NVMe Ethernet, and translate an address (i.e., an address of the host 740 in NVMe Ethernet) LAN_IP1 of a request received from the storage card 700 to an address WAN_IP1 of a Docker-hub 750. Accordingly, the firmware 720 may directly pull (download) a blob from the Docker-hub 750 in a case of the user requesting (docker image pull). The user may issue a container execution request (docker run) to the firmware 720 via the NVMe Ethernet drivers 741 and 710 to execute the downloaded image.

Referring to FIG. 8, a storage card may provide a file system (FS) 810 used for OS virtualization and container execution. In some embodiments, the storage file system 810 may manage concurrency and resolve vulnerability issues to realize a fully flexible ISP. The storage file system 810 may make the container image or data invisible to the host by using a detached NVMe namespace. If the container binds a folder or file (e.g., /usr, /bin, or /data) of a host file system 820 to a folder or file (e.g., /images, /layers, /container, /rootfs, or /data) (830), the storage card may use an Mode lock 840 synchronized with an Mode cache of the host through the NVMe Ethernet driver (e.g., 710 in FIG. 7), thereby addressing the concurrency issue due to the concurrent access.

In some embodiments, the storage file system 810 may add a reference counter to each Mode structure that the host file system 820 has, and protect it through an existing Mode's semaphore. This counter may be updated when the file (and folder) corresponding to the Mode opens or closes. The file may be accessible only if the counter is zero. For the counter update, the host file system 820 and the storage file system 810 may send and receive packets through an NVMe Ethernet drivers (e.g., 741 and 710 in FIG. 7). In a case where the container obtains permission of the file access, the host file system 820 may invalidate its Mode cache so that the container running on the storage device can refer the latest information.

Figure 9:
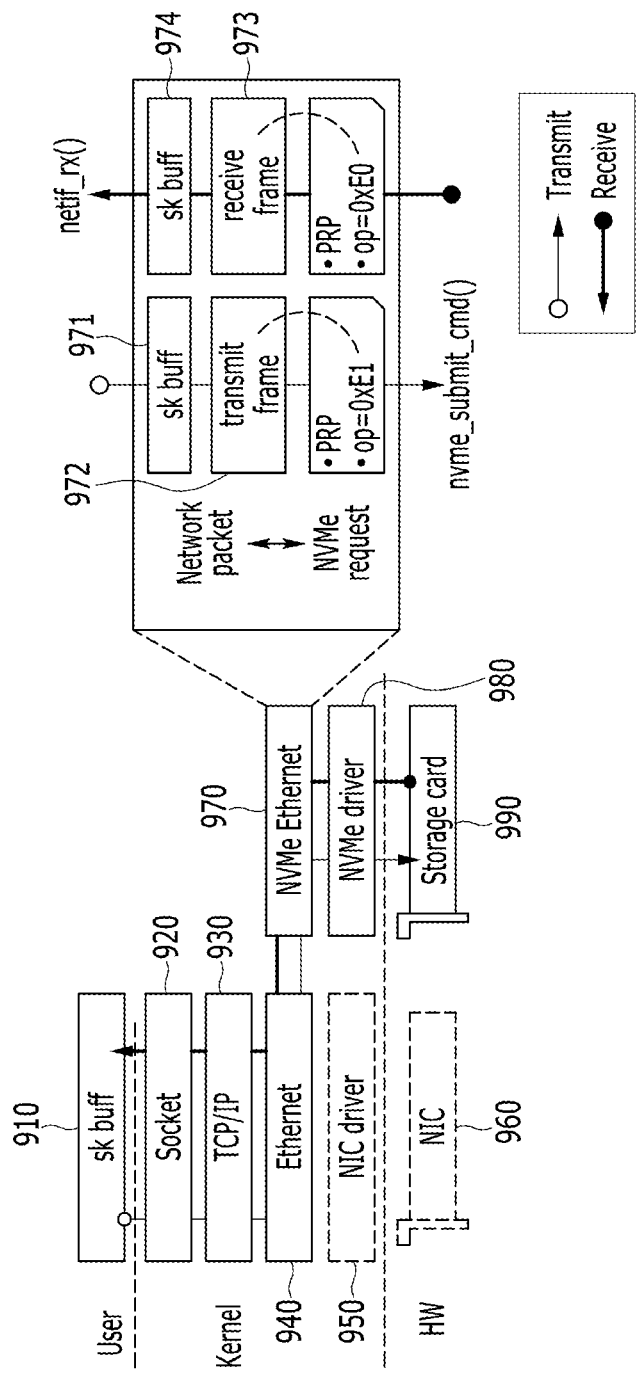
FIG. 9 is an example diagram showing NVMe Ethernet communication in a computing device according to an embodiment.

FIG. 9 is an example diagram showing NVMe Ethernet communication in a computing device according to an embodiment.

In some embodiments, since NVMe Ethernet overrides a standard NVMe protocol, Ethernet-based communication can be enabled without hardware changes. A host may communicate by issuing block I/O requests. Referring to FIG. 9, a host application may use a conventional network stack to communicate with a storage card 990. The network stack may include a socket layer 920, a transmission control protocol/internet protocol (TCP/IP) layer 930, and an Ethernet driver 940 in a kernel domain. In some embodiments, the network stack may further include a network interface card (NIC) driver 950 below the Ethernet driver 940. The network stack may further include a NIC 960 in a hardware domain. The NIC driver 950 and the NIC 960 may not be used for communication with the storage card 990.

When a user requests a service through docker-cli 910, a request may be transferred to the Ethernet driver 940 through the socket layer 920 and the TCP/IP layer 930. A request may be transferred from the Ethernet driver 940 to the docker-cli 910 through the TCP/IP layer 930 and the socket layer 920. In some embodiments, for ISP-related Ethernet services, an NVMe Ethernet stack may be provided. The NVMe Ethernet stack may include an NVMe Ethernet driver 970 and an NVMe driver 980 in the kernel domain. The NVMe Ethernet stack may further include a storage card 990 in the hardware domain That is, for the ISP-related Ethernet services, the NVMe Ethernet driver 970 may be loaded between the existing Ethernet driver 940 and the NVMe driver 980. The NVMe Ethernet driver 970 may convert incoming network packets (Ethernet packets) into NVMe requests (or NVMe commands). The NVMe request may be passed to the storage card 990 via the NVMe driver 980. For example, the NVMe request may be passed through an nvme_submit_cmd( ) function.

There may exist two challenges for the conversion of the Ethernet packets into the NVMe requests. First, in contrast to the existing network interfaces, NVMe cannot send a new request to the host. There is no storage card that can issue the NVMe request to the host, but the container requires such an upcall mechanism to communicate with the user. Second, the user can access the ISP or process I/O requests through both the existing block I/O requests and the network. To address these challenges, in some embodiments, vendor-specific commands may be defined in the NVMe protocol. These commands may include a transmit frame command and a receive frame command A structure of the two frame commands may be the same as that of other NVMe commands, but use different operation codes which are reserved for vendor-specific purpose in NVMe. For example, among operation codes defined for the vendor-specific purpose in NVMe, predetermined value (e.g., 0xE1) may be allocated for the transmit frame, and another predetermined value (e.g., 0xE0) may be allocated for the receive frame.

Referring to FIG. 9, when the NVMe Ethernet driver 970 receives an Ethernet request, it may extract an actual Ethernet packet and allocate a kernel page (e.g., a 4 KB kernel page). In some embodiments, the NVMe Ethernet driver 970 may extract a packet buffer (e.g., struct sk_buff) 971 that is buffering Ethernet packets. Further, the NVMe Ethernet driver 970 may copy data (e.g., packet header, packet data, checksum) included in the sk_buff 971 to the allocated page. Since the maximum size of Ethernet frame is 1.5 KB, a 4 KB page is sufficient to deliver all data of sk_buff 971. After generating an NVMe command 972, the NVMe Ethernet driver 970 may fill a PRP field with an address of the allocated page and fill the allocated operation code (e.g., 0xE1) of the transmit frame, and then submit the NVMe command 972 to the NVMe driver 980. Such the NVMe command 972 may be the transmit frame command.

To enable the storage card 990 to issue a request to the host, an asynchronous upcall mechanism utilizing pre-allocated NVMe commands may be used. When the storage card 990 is initialized in the kernel, the NVMe Ethernet driver 970 may issue a set of NVMe commands (i.e., receive frame commands) 973 to an SQ in advance even if there is no Ethernet request. For each NVMe command 973, the NVMe Ethernet driver 970 may allocate a kernel page and fill the receive frame operation code (e.g., 0xE0). Further, the NVMe Ethernet driver 970 may fill an address of the allocated kernel page in an PRP field. The storage card 990 may keep the corresponding NVMe command 973 without any processing. When the container wants to send a new Ethernet packet to the host, the storage card 990 may write (copy) a sk_buff 974 of the packet to the pre-allocated kernel page of the NVMe command 973 through the PRP, and then complete the NVMe command 973. The NVMe Ethernet driver 970 may read data from the kernel page of the completed NVMe command 973 to generate an Ethernet packet, and then call a netif_rx( ) function to pass the Ethernet packet to the network stack. Then, the NVMe Ethernet driver 970 may issue another receive frame command to the storage card 990 for the future communication.

Figure 10:
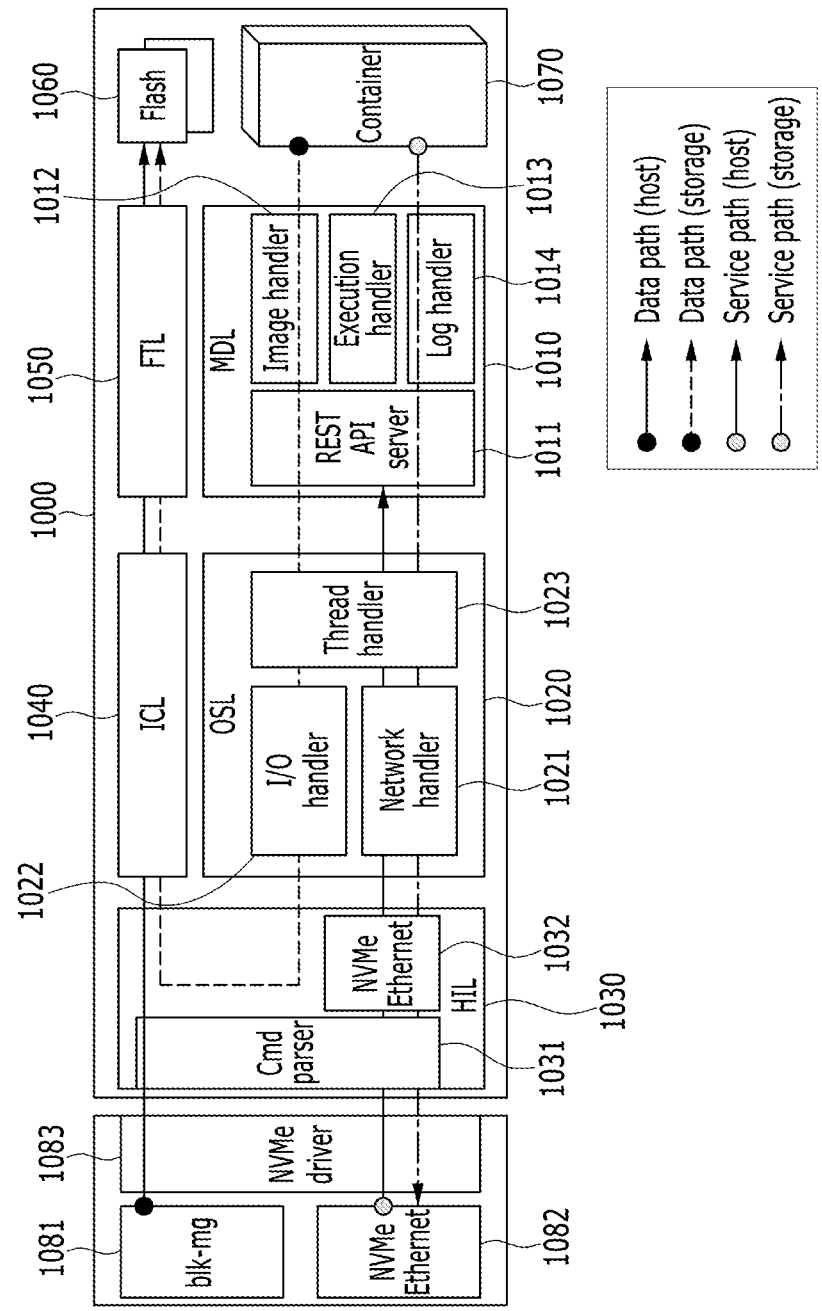
FIG. 10 is an example diagram for explaining firmware of a storage card according to an embodiment.

FIG. 10 is an example diagram for explaining firmware of a storage card according to an embodiment.

Referring to FIG. 10, firmware 1000 of the storage card may include a mini-Docker layer (MDL) 1010 that provides essential Docker functions to support container control and services and an OS feature layer (OSL) 1020 that provides OS features. The firmware 1000 may further include an HIL 1030, an ICL 1040, and an FTL 1050 similar to the conventional firmware. Since the firmware 1000 is designed towards simultaneously processing block I/O and network communication, the HIL 1030 may arbitrate a service path (HIL→OSL→MDL) and a data path (HIL→ICL→FTL).

A simple idea to implement ISP in the storage card may be to run an OS in the storage card and install Docker on the storage card. However, running the OS in the storage card may waste hardware resources, and degrade performance even if implementing the ISP. Therefore, by using the firmware (Docker-enabled firmware) into which essential kernel components (MDL 1010 and OSL 1020) for the container services are integrated, the ISP may be implemented in the storage card without wasting the hardware resources.

The MDL 1010 may perform functions extracted from the original Docker stack: API server (e.g., dockerd), container image management (e.g., containerd), container execution (e.g., runc) and standard I/O routing (e.g., runc). In some embodiments, the API server may be a representational state transfer (REST) API server. Hereinafter the API server is described as a REST API server. To this end, the MDL 1010 may include a REST API server 1011, an image handler 1012 that manages a container image, an execution handler 1013 that creates or runs a container, and a log handler 1014 that performs standard I/O routing. In some embodiments, the MDL 1010 may support a plurality of multiple functions (e.g., image downloading, container creation/execution function, and container communication/monitoring) without having the full Docker stack to execute a container (containerized ISP) on the OSL 1020.

The OSL 1020 may perform a network feature, an I/O feature, and a thread management feature. In some embodiments, the OSL 1020 may remove complicated kernel features such as cgroups, namespaces, and device drivers. To this end, the OSL 1020 may include a network handler 1021 that performs the network feature, an I/O handler 1022 that performs the I/O feature, and a thread handler 1023 that performs the thread management feature. The OSL 1020 may further include a system call emulation interface. The network handler 1021 may be connected to the HIL 1030 through an NVMe Ethernet driver 1032 of the HIL 1030, and the I/O handler 1022 may be connected to the ICL 1040. As such, the OSL 1020 may be not a kernel but a set of lightweight firmware components for supporting the service path. In some embodiments, the OSL 1020 may implement the key kernel features and system call emulation interface for the container execution.

The HIL 1030 may include a command parser 1031 and the NVMe Ethernet driver 1032. The command parser 1031 may parse an incoming request and decide which service/data paths are enabled for the incoming request. The command parser 1031 detects an operation code, and when a value of the operation code is a value indicating a transmit frame command (e.g., 0xE1) or a value indicating a receive frame command (e.g., 0xE0), may pass the corresponding request to the NVMe Ethernet driver 1032. That is, the command parser 1031 may pass the request to the service path. In some embodiments, the request to be passed to the service path may be passed via an NVMe Ethernet driver 1082 and an NVMe driver 1083 of the host. When the operation code has a different value, the HIL 1030 may perform a general block I/O service. That is, the command parser 1031 may pass the request to the ICL 1040, i.e., the data path. In some embodiments, the request to be passed to the data path may be passed through a block I/O queue 1081 and the NVMe driver 1083 of the host. The block I/O queue 1081 may be, for example, multi-queue block IO queuing (blk-mq).

In some embodiments, in the data path, the ICL 1040 uses an internal memory (e.g., 132 in FIG. 1) as a data buffer to copy data from host memory (e.g., 120 in FIG. 1) to the internal memory 132. The FTL 1050 may translate a logical address (e.g., LBA) of the request to a physical flash address (e.g., PPN) of flash media 1060, and transfer the data buffered in the internal memory 132 to the flash media 1060. In a case of a read request in the data path, a reverse process may be performed.

In some embodiments, to enable the service path, the NVMe Ethernet driver 1032 of the HIL 1030 may transfer target data (of a packet to receive) from a host memory to the internal memory 132, and then inform a location of the transferred data to the network handler 1021 of the OSL 1020 such that the OSL 1020 can process the corresponding service request.

In some embodiments, the NVMe Ethernet driver 1032 of the HIL 1030 may be located between an PCIe endpoint in the storage card and the network handler 1021. In some embodiments, while the NVMe Ethernet driver 1032 defines an IP address of the storage card, an actual port number may vary based on a service which a container uses and a port which the MDL 1010 uses. Accordingly, the network handler 1021 may check a port number recorded in a network packet (e.g., sk_buff), and then transfer the packet to a target process to receive the packet based on the port number. If the port number is a value (e.g., TCP 2375) associated with docker-cli, the network handler 1021 may forward the network packet to the REST API server 1011 of the MDL 1010. The REST API server 1011 may parse the network packet, i.e., the request to obtain its information and forward the information to the image handler 1012 that manages the container image or the execution handler 1013 that creates or executes the container through the thread handler 1023 of the OSL 1020. If the port number has a different value, the network packet may be forwarded to a container 1070. In some embodiments, the container 1070 may issue both a block I/O request for ISP and a network request for communicating with the host. The internal block I/O request may be served by the I/O handler 1022 of the OSL 1020, which may be passed to the data path of the firmware. In contrast, the internal network request may be forwarded to the network handler 1021 of the OSL 1020, which may be passed to the host through the NVMe Ethernet module 1032 of the HIL 1030 via an asynchronous upcall.

Next, an OSL and an MDL of a storage card are described with reference to FIG. 11 to FIG. 14.

As described with reference to FIG. 10, an OSL may include a network handler, an I/O handler, and a thread handler that manage network, I/O, and thread services, respectively. Since a storage card has no OS, all functions may be initialized by firmware. To this end, in some embodiments, a method of inserting a pointer of each handler to an interrupt vector table may be used. Further, in some embodiments, a system call corresponding to a part (e.g., half) of a system call provided by the kernel may be emulated in the OSL.

Figure 11:
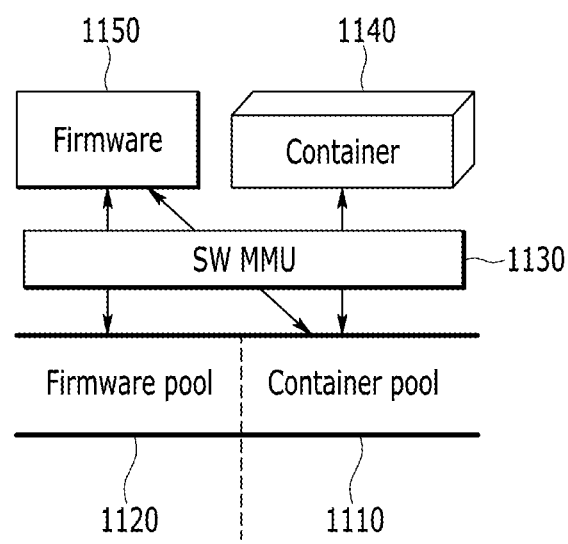
FIG. 11 is an example diagram for explaining a thread handler in a storage card according to an embodiment.

FIG. 11 is an example diagram for explaining a thread handler in a storage card according to an embodiment.

A thread handler of an OSL may handle a system call related to process management and scheduling (e.g. fork, exit, etc.), inter-process communication, and signal processing. In some embodiments, most functions of the thread handler are similar to those of the existing OS, but memory and page cache management may differ from those in the existing OS. In particular, the thread handler may be designed to reduce data copy and system call overhead imposed by switching between a user mode and a kernel mode.

Referring to FIG. 11, a thread handler of an OSL may separate a memory space of a storage device into a container pool 1110 and a firmware pool 1120, and may implement an allocator (e.g., slab) that allocates a page through a software memory management unit (MMU) 1130. The allocator, i.e., the software MMU 1130 may provide a physical memory page from either the container pool 1110 or the firmware pool 1120. A container 1140 may access the container pool 1110, and firmware 1150 may access the firmware pool 1120. In some embodiments, for memory protection, it may be set that only the firmware 1150 operating in a privileged mode is accessible to the page pool 1110 of all containers and the container 1140 is inaccessible to the firmware pool 1120. Such an embodiment may allow all arguments of the system call to be directly accessed from the firmware, thereby removing the data transfers caused by the mode switching.

Figure 12:
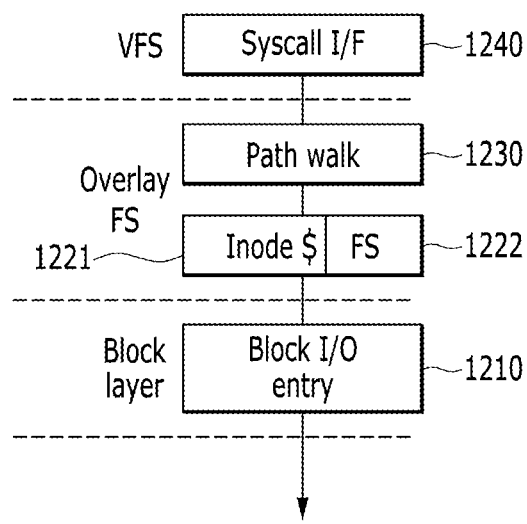
FIG. 12 is an example diagram for explaining an I/O handler in a storage card according to an embodiment.

FIG. 12 is an example diagram for explaining an I/O handler in a storage card according to an embodiment.

Referring to FIG. 12, in some embodiments, an I/O handler may remove several features of a block layer and NVMe fabric stacks, such as a page cache, an I/O scheduler, and an NVMe driver, and directly connect a block I/O entry 1210 to a data path of firmware (HIL→ICL→FTL). Further, the I/O handler may include an Mode cache 1221, and the Mode cache 1221 may convert a file descriptor into a corresponding LBA set by being aware of an Mode structure. The I/O handler may implement a file-related system call emulation interface 1240 and a path walker 1230 on the Mode cache 1221 and a file system 1222. To manage a concurrent access, the I/O handler may use the file system 1222 that manages an Mode's bitmap, and the bitmap may be managed by pre-allocation (prealloc) or multiple block allocation (mballoc). The path walker 1230 may mount a file so that an ISP task can perform file I/O without handshaking an LBA set.

In some embodiments, the system call emulation interface 1240 may correspond to a virtual file system (VFS), the path walker 1230, the Mode cache 1221, and the file system 1222 may correspond to an overlay file system, and the block I/O entry 1210 may correspond to a block layer.

Figure 13:
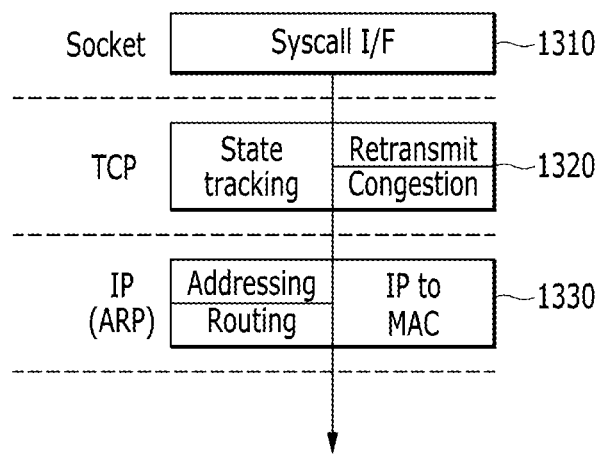
FIG. 13 is an example diagram for explaining a network handler in a storage card according to an embodiment.

FIG. 13 is an example diagram for explaining a network handler in a storage card according to an embodiment.

Referring to FIG. 13, a network handler may implement most functions of an TCP/IP layer, such as a TCP finite state machine (FSM) or a packet encapsulator. When a network packet comes after a TCP connection is established, the TCP FSM of the network handler may record a socket's connection status, such as an IP address or port number, so that the packet encapsulator can correctly generate a TCP/IP packet. For example, the TCP FCM may track the socket's connection state such as retransmission and congestion in a TCP layer (1320). Because a relationship between an IP address and a MAC address changes over time, the network handler may use an address resolution protocol (ARP) table to store the IP and MAC addresses as a key-value pair (1330). Accordingly, the network handler can perform addressing and routing. In some embodiments, the system call emulation interface 1310 may be implemented in a socket layer. In some embodiments, IP security (IPSec) or features of Netfilter may be excluded from the network handler.

Figure 14:
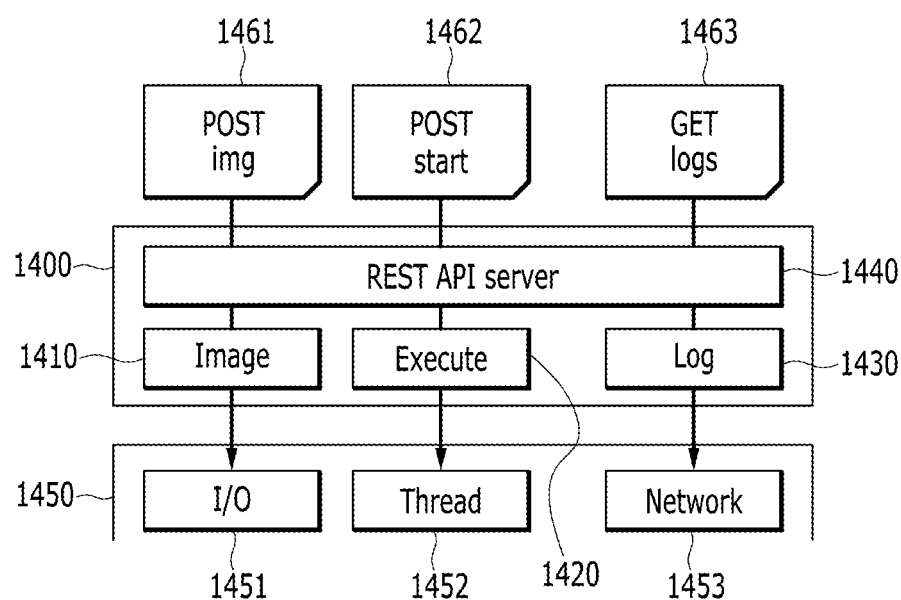
FIG. 14 is an example diagram for explaining a mini-Docker layer in a storage card according to an embodiment.

FIG. 14 is an example diagram for explaining an MDL in a storage card according to an embodiment.

In some embodiments, a main role of container management and execution of a storage card may be to process data in the storage device rather than implementing a Docker stack on the storage device. Accordingly, the MDL may implement a predetermined number (e.g., ten) of key Docker commands among all (e.g., 106) Docker commands. These key Docker commands may be used to handle image download, container execution, and real-time logging.

Referring to FIG. 14, the MDL 1400 may include a plurality of firmware handlers, i.e., an image handler 1410, an execution handler 1420, and a log handler 1430 according to each container management category. Atop the image handler 1410, the execution handler 1420, and the log handler 1430 implemented on an OSL's system call emulation interface, a REST API server 1440 may be implemented to communicate with docker-cli. The REST API server 1440 may process HTTP requests such as GET (retrieves), POST (creates), and PUT (updates). The host may use docker-cli to send an ISP management command to the storage card via an HTTP request, and the ISP management command may include information such as an image location and an IP address. The REST API server 1440 of the MDL 1400 may parse all information of the HTTP request and respond to the request over HTTP, and may invoke an MDL handler suitable for the request.

In some embodiments, the image handler 1410 may be implemented in the MDL in a form of layered firmware by modifying an image management function of dockerd. When an image offloading request (e.g., POST image) 1461 is received, the image handler 1410 may download a container image and distribute it to an area that is invisible to users but accessible for the firmware. Since the main role of the image handler 1410 is to store an image (/images/ manifest) in the flash media, the image handler 1410 may be tightly collaborate with an I/O handler 1451 of an OSL 1450. The image handler 1410 may store blobs transferred from local or remote over an NVMe Ethernet driver to/images/blobs, and unpack each blob to /images/layers by working with a manifest file. In some embodiments, the manifest file may store a table that manages each image layer in the form of an absolute path. Each layer may include fundamental files or folders for containerization, such as/bin, /lib, and/usr. Accordingly, the image handler 1410 of the MDL 1400 may merge the image layers into rootfs, which may be a file tree used by the container.

In some embodiments, the execution handler 1420 of the MDL 1400 may execute the container as manifest with assistance of a thread handler 1452 of the OSL 1450. The execution handler 1420 may implement a function of runc in firmware. When a Docker's container execution command (e.g., POST/start) 1462 is received, the execution handler 1420 may check the manifest file and extract an entryscript that explains how to execute the container. Further, the execution handler 1420 may mount the corresponding rootfs to the container and then run the entryscript by invoking the thread handler 1452 of the OSL 1450. On the other hand, because the rootfs is stored in the file system, it cannot be accessed from the host but can be accessed from the firmware. However, the rootfs may be bounded with a part of the host file system to put the data and take out the data. Thus, the execution handler 1420 of the MDL 1400 may lock Mode of a file or folder bounded to the host, thereby notifying the host's file system through the NVMe Ethernet driver that the file or folder is in use.

In some embodiments, the log handler 1430 may manage container monitoring. In a Docker stack, all stdout and stderr data of each container may be stored in /containers/<id>/rootfs/log. Thus, when the host sends a logging command (e.g., GET/logs) 1463, the log handler 1430 may transfer monitoring information to the host by collaborating with a network handler 1453 of the OSL and the NVMe Ethernet driver. This function can allow the host monitor a state of the container running on the storage card in real time.

As described above, in some embodiments, the storage card may execute a wide spectrum of data processing applications by offering a fully flexible and practical ISP model. In some embodiments, the storage card may apply lightweight OS-level virtualization to the storage device, which may be well harmonized with hardware architectures of the existing storage card and host-side software ecosystems. Some embodiments may provide NVMe Ethernet ("Either-oN") that enables a network-based ISP management mechanism and point-to-point communication between a host and an ISP task by overriding the standard NVMe protocol. In some embodiments, the Ether-oN may allow the storage card to serve ISP-related requests without changes existing physical interfaces for both network and the storage card. In some embodiments, Ether-oN may allow users to supply data, to query an ISP status, and to retrieve results by directly interacting with the storage card, which can realize on-demand and real-time data analysis of ISP.

Some embodiments may integrate essential features for OS-level virtualization into a firmware stack of the storage card and emulate system calls, such that existing applications can be offloaded to the storage device in a form of Docker containers. In some embodiments, the storage card may download container images stored in a local or remote Docker Hub repository. Some embodiments may containerize ISP tasks and execute the IPS tasks in the storage card without a modification of existing software environment. This can provide highly flexible programmability and generality of ISP task execution. For example, users may require neither changing a data processing algorithm to interact with vendor-specific ISP runtimes to utilize the ISP nor a specialized toolchain to cross-compile ISP tasks to fit them into the firmware of the storage card. This can allow the ISP to be applied in various computing environments without changing the corresponding system environment. In addition, the firmware stack of the storage card may include filesystem features underneath virtualization runtimes such that the containers can process data without a host-side OS intervention. Since image files and data of each container are owned by different users, the storage card may secure a reserved storage in the storage card to manage them in a separate way. A private storage, managed a filesystem of the storage card, may be logically separated from the host by using an NVME detached namespace, and may only be accessed by each container. In some embodiments, the file system of the storage card may protect the container's image and its own data against anonymous processes as well as unauthorized accesses.

In some embodiments, the filesystem of the storage card may synchronize the host file system and the Mode cache to prevent data loss due to concurrent accesses. In some embodiments, the storage card may reduce host resource involvement for the ISP and may exhibit better performance compared to the existing ISP model.

The functions of the NVMe Ethernet driver or firmware described above may be implemented as a computer program readable by a computer (e.g., a processor of a host and a processor of a storage card) on a computer-readable medium. In some embodiments, the computer-readable medium may include a removable recording medium or a fixed recording medium. In some embodiments, the computer-readable program recorded on the computer-readable medium may be transmitted to another computing device via a network such as the Internet and installed in another computing device, so that the computer program can be executed by another computing device.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A computing device comprising:
   a host to which a first internet protocol (IP) address is set; and
   a storage card including a computing complex configured to execute firmware and a storage device, and to which a second IP address is set,
   wherein the host is configured to convert a first Ethernet packet, which includes an in-storage processing (ISP)-related request and is destined for the second IP address, into a first non-volatile memory express (NVMe) request according to an NVMe protocol, and transfer the first NVMe request to the storage card, and
   wherein the firmware is configured to parse the first NVMe request to perform the ISP-related request,
   wherein the host is configured to execute a network driver, and
   wherein the network driver is configured to:
   copy data of the first Ethernet packet to a kernel page;
   fill a physical region page (PRP) field of the first NVMe request with an address of the kernel page;

set an operation code of the first NVMe request to a value indicating a transmit frame command; and transfer the first NVMe request to the storage card through an NVMe driver.

2. The computing device of claim 1, wherein the host is configured to execute a network driver, and wherein the network driver is configured to, in order to receive a second Ethernet packet destined for the first IP address from the storage card:

submit a second NVMe request to an NVMe queue;

allocate a kernel page to allow the storage card to write data of the second Ethernet packet to the kernel page;

set an operation code of the second NVMe request to a value indicating a receive frame command; and generate the second Ethernet packet by reading the data from the kernel page of the second NVMe request completed by the storage card.

3. The computing device of claim 1, wherein the ISP-related request includes an offloading request of a container image or a container execution request for executing a container.

4. The computing device of claim 3, wherein the firmware includes:

a mini-Docker layer configured to performs a docker function for container control and service for the ISP; and an operating system feature layer configured to perform an operating system feature.

5. The computing device of claim 4, wherein the firmware further includes a host interface layer, and wherein the host interface layer includes a command parser configured to parse the first NVMe request and select a service path or a data path.

6. The computing device of claim 5, wherein the host interface layer further includes a network driver, wherein the command parser is configured to select the service path in response to an operation code of the first NVMe request having a predetermined value, and select the data path in response to the operation code of the first NVMe request not having the predetermined value, and wherein in response to selection of the service path, the network driver is configured to copy the first Ethernet packet stored in a memory of the host indicated by a PRP of the first NVMe request to an internal memory of the computing complex, and notify a location of the internal memory to which the data is copied to the OS feature layer.

7. The computing device of claim 6, wherein the firmware further includes an internal cache layer and a flash translation layer, and wherein in response to selection of the data path, data of the first NVMe request may be stored in the storage device through the internal cache layer and the flash translation layer.

8. The computing device of claim 6, wherein the OS feature layer includes a network handler configured to perform a network function and an input/output (I/O) handler configured to perform an I/O function, and wherein the mini-Docker layer includes an API server, an image handler configured to manage the container image, and an execution handler configured to execute the container.

9. The computing device of claim 8, wherein the network handler is configured to forward the first Ethernet packet to the API server, in response to a port number of the first Ethernet packet having a value associated with a Docker command line interface, and wherein the API server is configured to transfer information obtained by parsing the first Ethernet packet to the image handler or the execution handler.

10. The computing device of claim 9, wherein the network handler is configured to forward the first Ethernet packet to the container, in response to the port number of the first Ethernet packet not having the value associated with the Docker command line interface.

11. The computing device of claim 8, wherein the container is configured to generate an I/O request for the ISP or a network request to communicate with the host.

12. The computing device of claim 11, wherein the I/O handler is configured to forward the I/O request to the data path.

13. The computing device of claim 11, wherein the network handler is configured to forward the network request to the host through an asynchronous upcall via the network driver.

14. The computing device of claim 8, wherein the OS feature layer further includes a thread handler, and wherein the thread handler is configured to separate a memory space of the storage device into a container pool accessible by the container and a firmware pool accessible by the firmware, and provide a physical memory page from either the container pool or the firmware pool.

15. The computing device of claim 8, wherein the mini-Docker layer may further include a log handler, and wherein the log handler is configured to manage container monitoring, and transmit container monitoring information to the host through the network handler and the network module in response to receiving a logging command from the host.

16. A storage card connected to a host, the storage card comprising:

a processor configured to execute firmware; and a storage device, wherein the firmware includes:

a host interface layer is configured to select a service path or a data path by parsing a non-volatile memory express (NVMe) request according to an NVMe protocol received from the host;

a mini-Docker layer including an image handler configured to perform container image management based on a network packet included in the NVMe request, and an execution handler configured to execute a container based on the network packet; and an operating system (OS) feature layer incudes a network handler configured to, in response to selection of the service path, forward the network packet to the mini-Docker layer or the container, and forward a network request, generated in the container, for communicating with the host to the host interface layer.

17. The storage card of claim 16, wherein the mini-Docker layer further includes an API server, wherein the network handler is configured to forward the network packet to the API server in response to a port number of the network packet having a predetermined value, and forward the network packet to the container in response to the port number of the network packet not having the predetermined value have, and wherein the API server is configured to transfer information of the network packet to the image handler or the execution handler.

18. The storage card of claim 17, wherein the firmware further includes an internal cache layer and a flash translation layer, and
   wherein the OS feature layer may further include an input/output (I/O) handler configured forward the network packet to the internal cache layer in response to selection of the data path.

19. A computer program stored in a non-transitory recording medium and configured to be executed by a computing device including a host and a storage card, the computer program causing the computing device to execute:
   setting a first internet protocol (IP) address and a second IP address to the host and the storage card, respectively;
   converting a first Ethernet packet, which includes an in-storage processing (ISP)-related request and is destined for the second IP address, into a first non-volatile memory express (NVMe) request according to an NVMe protocol; and
   forwarding the first NVMe request to an NVMe driver to transfer the first NVMe request to the storage card,
   wherein the converting the first Ethernet packet comprises:
   copying data of the first Ethernet packet to a kernel page;
   filling a physical region page (PRP) field of the first NVMe request with an address of the kernel page; and
   setting an operation code of the first NVMe request to a value indicating a transmit frame command.

* * * * *